Dec. 16, 1958 K. F. WILLIAMS 2,864,225
WEED CUTTING DEVICE
Filed Feb. 2, 1956 2 Sheets-Sheet 1
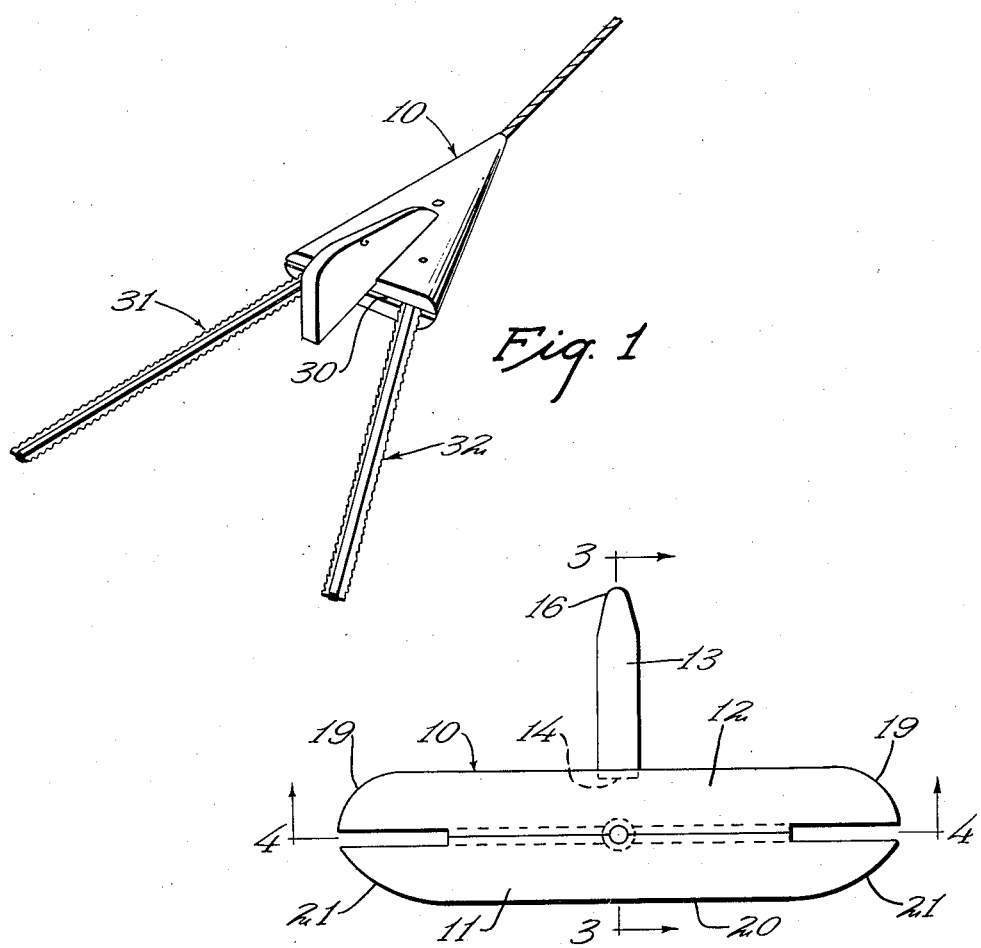
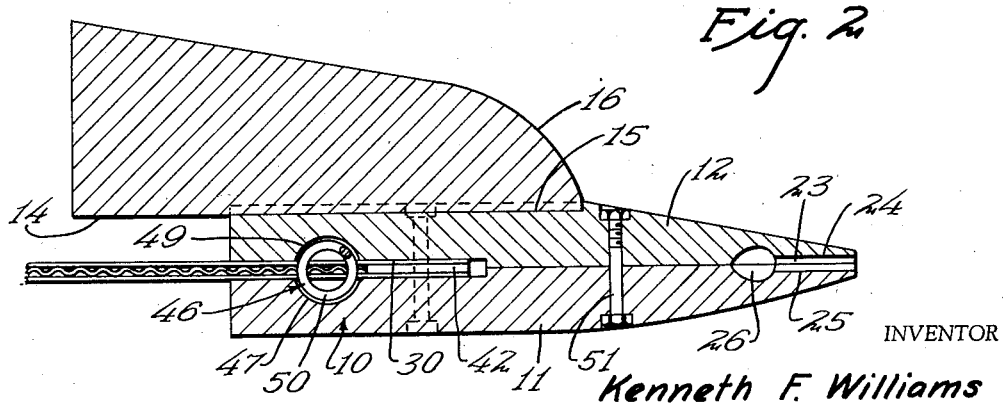
INVENTOR
Kenneth F. Williams
BY Robert M. Dunning
ATTORNEY Dec. 16, 1958 K. F. WILLIAMS 2,864,225
WEED CUTTING DEVICE
Filed Feb. 2, 1956 2 Sheets-Sheet 2

INVENTOR
Kenneth F. Williams
BY
ATTORNEY

United States Patent Office 2,864,225
Patented Dec. 16, 1958

2,864,225

WEED CUTTING DEVICE

Kenneth F. Williams, St. Paul, Minn.

Application February 2, 1956, Serial No. 562,985

2 Claims. (Cl. 56—8)

This invention relates to an improvement in weed cutting devices and deals particularly with an apparatus for cutting off submarine growth close to the bottom of a body of water.

Various means have been provided for cutting weeds near the bottom of a lake or river. Certain of these devices are motor driven and others are merely drawn over the bottom of the lake to cut off the weeds at this point. The present device comprises somewhat of a combination of such devices for while the apparatus is not mechanically operated by a motor or the like, it is pulled along the bottom of the lake by a motor driven boat and includes a means of movably supporting the cutting blades so that they tend to move as the device is pulled.

A feature of the present invention lies in the provision of a weed cutting apparatus including a pair of diverging blades which are mounted upon a mounting structure near the point of convergence. This mounting device permits the angularity between the blades to vary to some extent so as to provide a novel blade action which is more effective for cutting the weeds than in the event the blades were held in fixed relation.

A further feature of the present invention resides in the provision of a wedge-shaped mounting member which may be drawn through the water near the bottom of a lake or river and which includes a pair of angularly related blades pivotally supported at their forward ends to the mounting member to form in effect, a continuation of the wedge-shaped body. These blades are toothed and are so constructed that the movement of the blades tends to cut the weeds near the bottom of the body of water.

A further feature of the present invention resides in the particular construction of the blade mounting device which acts to protect the forward ends of the blades and is shaped to prevent the device from catching in obstructions near the bottom of the body of water.

An added feature of the present invention resides in the particular construction of the cutting blades. The blades are formed of an elongated strip of metal which is transversely corrugated and then which is angularly ground so that the tops of the corrugations project beyond the bottoms of the corrugations on one side of the blade to provide a blade which is notched when viewed from above the plane of the strip. The teeth thus formed are thus corrugated when viewed from the edge of the strip and notched when viewed from the top of the strip so as to provide effective cutting teeth capable of cutting into the stems of the weeds and cutting them off near the bottom surface of the body of water.

A further feature of the present invention lies in the simplicity and effectiveness of the structure. The blades may be formed by merely passing an elongated strip of suitable material through corrugating rollers or the like and in grinding the edge of the strip angularly, thus automatically producing the sharpened tooth surface.

These and other objects and novel features of my invention will be more clearly and fully set forth in the following specification and claims.

In the drawings forming a part of the specification:

Figure 1 is a top perspective view of the apparatus showing the construction thereof.

Figure 2 is an enlarged front elevational view of the apparatus with the blades removed therefrom.

Figure 3 is a sectional view longitudinally through the apparatus on the line 3—3 of Figure 2, the view being on a scale corresponding to Figure 2.

Figure 4:
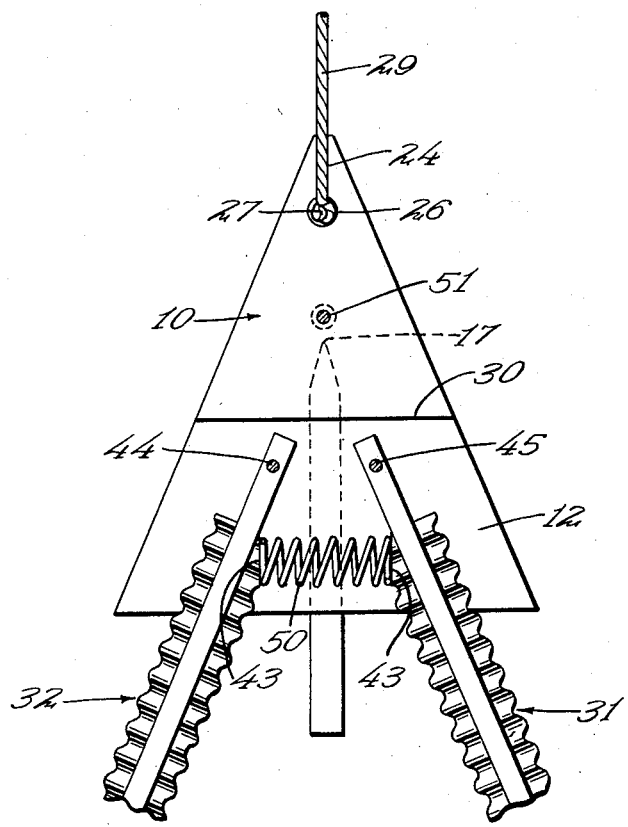
Figure 4 is a sectional view through the apparatus, the position of the section being indicated by the line 4—4 of Figure 2 and on a somewhat smaller scale.

The weed cutting device has been indicated in Figure 1 of the drawings showing diagrammatically the manner in which it may be drawn through the water. The apparatus includes a wedge-shaped blade holder 10 which is formed of three main parts which are secured together. As shown in Figure 2 these include a bottom section 11, a top section 12, and a vane or guide 13. The vane 13 is secured to the upper section 12, the lower edge 14 of the vane 13 extending into a longitudinal groove 15 in the upper surface of the upper section 12. The vane 13 has a generally flat under surface 14 and an upwardly curved or arched upper surface 16. The vane thus tapers to a minimum thickness at its forward end. The vane 13 is also reduced in thickness along the upper edge 16 so that it comes to a point at its forward end 17 (see Figure 4) and is provided with a relatively pointed upper edge as indicated in Figure 2 of the drawings.

The body section 12 is generally triangular in plan and is provided with curved side edges 19 so that the center portion of the wedge-shaped body is somewhat thicker than the edges to simplify the movement of the member through the water. The bottom section 11 is generally similarly shaped having a flat under surface 20 with rounded side edges 21. The bottom section 11 is also generally triangular in plan and is arranged in contiguous relation with the upper section.

A generally cylindrically elongated passage 23 extends into the pointed forward end of the body 10 to extend longitudinally between the two sections. This passage is formed by an upwardly bowed groove 24 in the upper section 12 and a downwardly bowed groove 25 in the upper surface of the bottom section 11. This passage 23 leads to an enlargement or chamber 26 also formed partially in both sections of the blade holding structure. As is indicated in Figure 4 of the drawings, the chamber 26 is designed to accommodate the knotted end 27 of a rope or cable 29 to anchor the cable to the blade holders when the two sections are attached together with the rope or cable extending through the passage 23.

Figures 5, 6, 7:
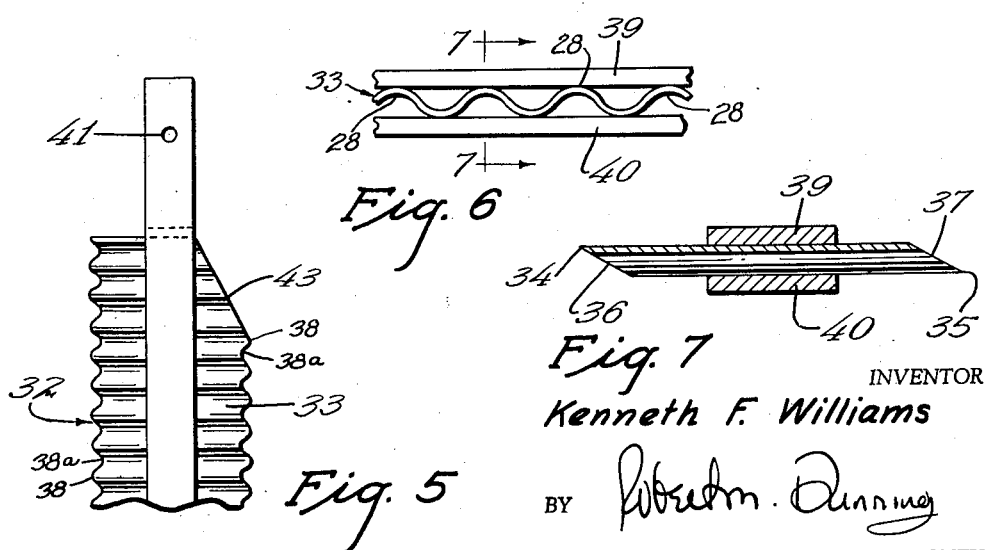
Figure 5 is an enlarged plan view of an end portion of one of the cutting blades.
Figure 6 is an enlarged edge elevated view of a small portion of one of the blades.
Figure 7 is a sectional view transversely through one of the blades, the position of the section being indicated by the line 7—7 of Figure 6.

Each of the sections 11 and 12 are notched along the rear edges of their mating surfaces to provide, in effect, a transverse slot 30 extending on a horizontal plane through the blade holder 10. This slot actually extends approximately one-half the length of the body and from side to side thereof between the upper and lower surfaces of the body 10. This slot 30 is designed to accommodate a pair of blades 31 and 32 which are similarly formed but are normally inverted with respect to one another. The blades 31 and 32 are formed as best illustrated in Figures 5, 6 and 7 of the drawings. Each blade includes an elongated strip 33 which is transversely corrugated throughout at least the major portion of its length, the corrugations having been generally indicated by the numeral 28. As is indicated in Figure 7 of the drawings, the side edges 34 and 35 are angularly ground along inclined planes 36 and 37 which may be parallel or may be inclined in opposite directions. This arrangement produces a wavy sharpened edge on each side of the strip as is best indicated in Figure 5 of the drawings. Not only is the edge of the blade toothed, as is indicated in Figure 5, but the teeth designated by the numeral 38 are continually sharp so that the projecting portions of the teeth as well as the intermediate portions or indentations 38a may serve as a cutting surface. This arrangement is particularly advantageous for use on weeds and similar growth as the weeds may engage the blade while the blade is moving in various directions with respect to the object being cut. In other words the weeds may engage the sides of the teeth or the ends thereof or the movement of the blade may tend to bend the weed against an opposite side of the toothed structure. As a result blades formed as described are particularly advantageous for the purpose described.

As is also indicated in Figures 5 through 7, the corrugated strip 33 is preferably reinforced by elongated bars or strips 39 and 40 between which the corrugated strip 33 is sandwiched. The reinforcing strips 39 may be secured to the corrugated strip 33 by any suitable means (not shown) such as welding, bolting, riveting or the like. The strips 39 and 40 are relatively narrow as compared to the corrugated strip so that the cutting edges project beyond the sides of the reinforcing strips. The strips 39 and 40 project beyond an end of the corrugated strips and are provided with a pivot aperture 41 therethrough which is normal to the planes of these strips. If desired, a short filler piece 42 may be sandwiched between the ends of the strips 39 and 40 which is of the same thickness as the corrugated strip and to provide a solid end.

Each of the blades 31 and 32 is provided with an angularly cut edge 43 on one side of the blade, the side thus cut being the inner side thereof. As a result these angularly cut edges are generally parallel when the blades are attached to the blade holder 10. Pivot bolts 44 and 45 extend through the holder in vertical parallel relation to pivotally attach the blades to the blade holder.

As is indicated in Figures 3 and 4 of the drawings, a transverse cylindrical chamber 46 is provided between the upper and lower sections 12 and 11 of the blade holder 10, this chamber being formed by opposed grooves 47 and 49 in the inner parallel surfaces of these two sections. A coil spring 50 is provided in the chamber 47 with the ends of the spring engaging against the angularly cut surfaces 43 of the two blades. To provide a floating action of the structure, the length of the cylindrical chamber is limited and the spring bears against the blade with force only when the angle between the blades tends to decrease. This arrangement permits either blade to flex inwardly independently of the other thus limiting the change in direction of the blade holder 10 as it is drawn through the water.

In assembling the apparatus the blades 31 and 32 are placed upon one of the sections and the pivot bolts 44 and 45 are placed through that section and through the apertures 41 through the ends of the blades. The spring 50 is inserted into the upwardly opening portion of the chamber 46 and the knotted end 27 of the cable 29 is inserted into the upwardly opening portion of the chamber 26 with the adjoining portion of the cable 29 extending through the corresponding groove 24 or 25.

The other section of the holder is next placed upon the first mentioned section so that the bolts 44 and 45 extend through both sections. Suitable nuts are provided to hold the bolts in place or the bolts may thread into the last mentioned section. An additional bolt 51 is also inserted through the two sections and the sections are therefore securely attached.

The apparatus is lowered from a boat or placed upon the bottom of the body of water preferably with the vane 13 extending upwardly. The device is then drawn along the bottom, usually with the cable 29 being of sufficient length so that the pull upon the cable will not raise the apparatus out of contact with the lake bottom. As the wedge-shaped blade holder moves through the weeds it separates the weeds to either side of the holder. Further movement brings these weeds as well as others into engagement with the cutting edges on the blades. The blades act to cut and saw the weeds severing the upper portions from the roots. The cut weeds then float to the surface of the water and may be gathered in any suitable manner.

If the apparatus moves between rocks or other objects which are not sufficiently spaced to permit the arms to pass therebetween while in the normal position, the blades flex inwardly to the required extent. The vane 13 tends to hold the apparatus in a straight path. This is simplified by the pivotal mounting of the blades as the pull tending to resist movement of the cutting device varies depending upon the weeds being engaged by each blade and by the variance in force required to cut them. With the present arrangement the blades are permitted to flex inwardly when required relieving the strain and tending to equalize strain on opposite sides of the apparatus.

In accordance with the patent statutes, I have described the principles of construction and operation of my weed cutting device, and while I have endeavored to set forth the best embodiment thereof, I desire to have it understood that obvious changes may be made within the scope of the following claims without departing from the spirit of my invention.

I claim:

1. A weed cutting apparatus including a holder comprised of top and bottom sections provided with confronting surfaces having marginal notches disposed across their rear edges to produce a rearwardly directed slot and transverse opposed grooves forming an elongated chamber within said holder, a pair of blades having cutting edges along one side, pivot means passing through said top and bottom sections to pivotally attach said blades to said holder at a locus forward of said transverse chamber, and a coil spring disposed within said chamber, whereby said blades may bear against the ends of said spring when either said blades are pivotally urged toward each other.

2. A weed cutting apparatus including a blade holder designed to be towed through the water, a pair of blades pivotally attached to said blade holder, and a transverse spring having one end normally engaging one blade and its opposite end normally engaging the other blade, thereby biasing said blades toward diverging relation, said spring being interposed between said blades within the holder at points spaced from their pivotal connection with the holder, said points being formed by angularly cut edges on said blades.

References Cited in the file of this patent

UNITED STATES PATENTS

| 2,567,248 | Stahmer | Sept. 11, 1951 |
| 2,702,975 | Friesen | Mar. 1, 1955 |

FOREIGN PATENTS

| 403,810 | Germany | Oct. 8, 1924 |